March 14, 1967  V. EVTUHOV ET AL  3,309,621

MODE CONTROLLED LASER

Filed June 24, 1963  3 Sheets-Sheet 1

INVENTORS.
VIKTOR EVTUHOV,
JAMES K. NEELAND,
BY
James K. Hackell
ATTORNEY.

United States Patent Office 3,309,621
Patented Mar. 14, 1967

3,309,621
MODE CONTROLLED LASER
Viktor Evtuhov, Pacific Palisades, and James K. Neeland, Santa Monica, Calif., assignors to Hughes Aircraft Corporation, Culver City, Calif., a corporation of Delaware
Filed June 24, 1963, Ser. No. 289,823
3 Claims. (Cl. 331—94.5)

This invention relates to a mode controlled laser and more particularly to a transverse mode controlled laser and to the method for providing same.

As is well known, the resonant cavity (optical resonator) employed in laser oscillators is a very high order cavity, that is, its dimensions are large compared with the wavelength of the radiation emitted. Accordingly, conventional lasers are multimode devices. That is, within a certain narrow frequency range the output consists of several frequencies corresponding to the various electromagnetic modes of the laser resonator. Thus, ordinarily within the active volume there are very many longitudinal and transverse modes excited, each transverse mode having a cross-sectional area much smaller than the total cross-sectional area of the active volume. The control and selection of longitudinal modes are well known in the art and will not be discussed here.

It has been shown in the past that the number of transverse modes of oscillation in ruby lasers, for example, can be reduced by reducing the laser pumping level, and that single transverse mode operation can be obtained at pumping levels very close to threshold. In this connection reference is made to an article entitled "Observations Reated to the Transverse and Longitudinal Modes of a Ruby Laser" published by the inventors in Applied Physics, vol. I, No. 4, page 517, July 1962. However, under such circumstances the laser has very low output (approximately 2 or 3-microsecond pulses with an amplitude of the order of a few watts), and the operation is unstable in the sense that very small increases in pump power (approximately 1%) tend to excite additional modes and thus additional and uncontrolled output frequencies.

It should be evident that it would be highly desirable to provide a laser oscillating in a single mode, but having a relatively high power output. Such a laser would not change or add frequencies or change beam width with increases in input pumping power. Such a laser would, for example, be very desirable as a local oscillator power source in an optical frequency heterodyne transmitting or superheterodyne receiving system.

It is therefore an object of the present invention to provide a laser which has a concentrated output, obtainable at high pumping levels, in a single transverse mode of oscillation.

It is another object of this invention to provide a laser wherein all the laser energy which ordinarily goes into a large number of transverse modes is concentrated in a single transverse mode, thus obtaining stable, high-output, single mode operation.

It is still another object of the invention to provide a method of producing a laser which has a concentrated output obtainable at high pumping levels in a single transverse mode of oscillation.

These and other objects are achieved in a laser apparatus comprising a laser cell including laser material and having reflecting means optically coupled to the laser material, the laser cell having a plurality of characteristic modes of operation. The laser apparatus also includes pump means coupled to the laser cell for exciting the laser material to an oscillating condition. According to the invention, the above mentioned reflecting means is adapted to support only a particular transverse mode preselected from the plurality of characteristic modes of oscillation.

The invention and specification thereof will be described hereinafter by way of example and with reference to the accompanying drawings, in which.

The devices and techniques hereinafter described for the limiting of the number of excited transverse modes at all pumping levels and the increasing of the size of the cross-sectional area of the transverse mode will be made with reference to the drawings. The present discussion will be limited to ruby lasers, but the proposed device and methods of transverse mode control should be applicable to other types of lasers.

Figure 1:
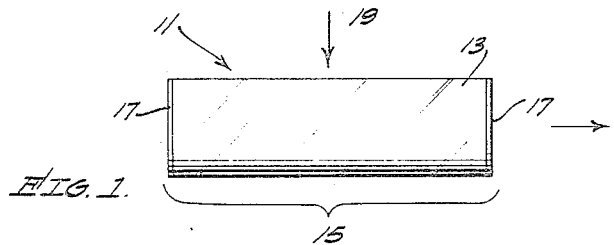
FIG. 1 is a schematic illustration of a transverse mode controlled laser according to one embodiment of the invention.

Referring now to the mode controlled laser apparatus of FIG. 1, there is shown a laser cell 11 which comprises laser material such as ruby rod 13 disposed within an optical resonator 15 having reflecting means such as deposited silver mirrors 17 optically coupled to the ruby rod 13. Also, there is illustrated a non-uniform pump field 19 provided by a source of such a field (not shown), for exciting the cell 15 to an oscillating condition, by a phenomenon now well known in the art. It is to be pointed out that, as will be thoroughly described later, the laser cell 11 has a plurality of characteristic modes of oscillation, and by adapting or limiting the reflective properties of the silver mirrors 17 to reflect only a preselected mode of oscillation, only that mode will be present in the output of laser apparatus irrespective of how high the pump field energy may be.

At least one of the mirrors 17 has a nearly total reflectivity (approximately 98%), while the other has a reflectivity of the order of 90% so that an output can be obtained as indicated by the arrow adjacent the right end of the device.

Figure 2:
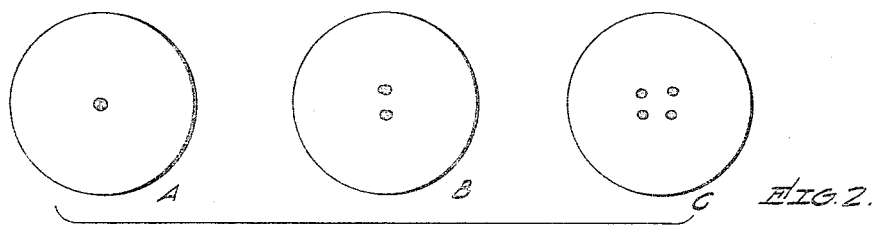
FIG. 2 illustrates a number of mode patterns of the laser of FIG. 1 operating at a pump input power just above threshold.

FIG. 2 illustrates the single mode output field patterns of the laser of FIG. 1 operating at a pump input power just sufficient to cause oscillation (threshold). FIG. 2(a) is a single-lobe pattern; FIG. 2(b) is a two-lobe pattern; and FIG. 2(c) is a four-lobe pattern. As will be explained later, the number of lobes can be selected by changing the relationship between the non-uniform pump field 19 with respect to the laser cell 11.

The theory and operation of the invention will be made clear with reference to the following:

Transverse modes are usually studied by examining the intensity distribution in the near field of the emitted laser beam. The following properties of the intensity variation patterns are pertinent to the present discussion:

(1) Pattern sizes are independent of the diameter of the lasing material sample, or of the size of the pumped volume.

(2) Each ruby crystal can be made to oscillate in a number of mode patterns by changing the pump energy distribution on the periphery of the ruby.

(3) Increase in pump power implies mode hopping and excitation of additional and more complicated modes.

The transverse mode behavior can be understood theoretically by noting that effectively the end-plates or mirrors of the resonator are not plain but are slightly curved, as may be demonstrated by Twyman-Green interferrometer studies. The curvature may be the result of optical path variation inside the ruby as well as a slight physical curvature of the reflectors. This slight curvature permits the application of the resonator theory of G. D. Boyd and J. P. Gordon published in the Bell System Technical Journal, vol. 40, page 489, 1961. According to this theory, the field distribution for a mode pattern specified by indices $m$ and $n$ is given approximately by $$\left|\frac{E(x, y, z_0)}{E_0}\right| = \sqrt{\frac{2}{1+\xi^2}} \cdot \frac{\Gamma\left(\frac{m}{2}+1\right)\Gamma\left(\frac{n}{2}+1\right)}{\Gamma(m+1)\Gamma(n+1)} \cdot H_m\left(\overline{X}\sqrt{\frac{2}{1+\xi^2}}\right) \cdot H_n\left(\overline{Y}\sqrt{\frac{2}{1+\xi^2}}\right) \cdot \exp\left(\frac{-kw^2}{b(1+\xi^2)}\right) \quad (1)$$

where Boyd and Gordon notation is used. In the $y=0$ plane of a two-lobe pattern which will be used as an example, the field distribution is $$\left|\frac{E(x, z_0)}{E_0}\right| = \sqrt{\frac{\pi k}{b}} \frac{2}{1+\xi^2} x \exp\left(\frac{-1}{1+\xi^2} \frac{k}{b} x^2\right) \quad (2)$$

Differentiating this with respect to $x$, there will be found the distance, $x_m$, at which the field is a maximum $$x_m = \sqrt{\frac{b\lambda(1+\xi^2)}{4\pi}} \quad (3)$$

Here $b$ is the radius of curvature of the end-plates of a confocal resonator which is equivalent to the actual resonator (cell 15) under consideration. If $b'$ is the actual radius of curvature of the resonator end-plates (such as mirrors 17), then $$b = \sqrt{2db' - d^2} \quad (4)$$

where $d$ is the resonator length, and $$x_m = \left[\frac{\lambda d}{4\pi}\left(1+\frac{4z_0^2}{2db'-d^2}\right)\right]^{1/2}\left(\frac{2b'}{d}-1\right)^{1/4} \quad (5)$$

There are two basic idealized models for the laser cell 11. One assumes that the reflectors or mirrors 17 may be considered to be curved. This results in a beam which is diverging at a certain angle as it leaves the resonator. The other takes the reflectors as flat and parallel with a lens between them and gives rise to a parallel beam leaving the resonator. The second model is applicable if most of the path differences inside the ruby are due to index of refraction variations. In practice, however, the range of $b'$ is such that it is immaterial which of the models is used. Thus, for $b'=20$ cm., the difference in $x_m$ at the face of the resonators predicted by the two models is only approximately 1.2% and is less for a larger $b'$. Therefore, for the sake of simplicity the second model will be used in most cases.

Since the resonator is filled with a dielectric, then $$x_m = \left(\frac{\lambda d}{4\pi n}\right)^{1/2}\left(\frac{2b'}{d}-1\right)^{1/4} \quad (6)$$

Figure 3:
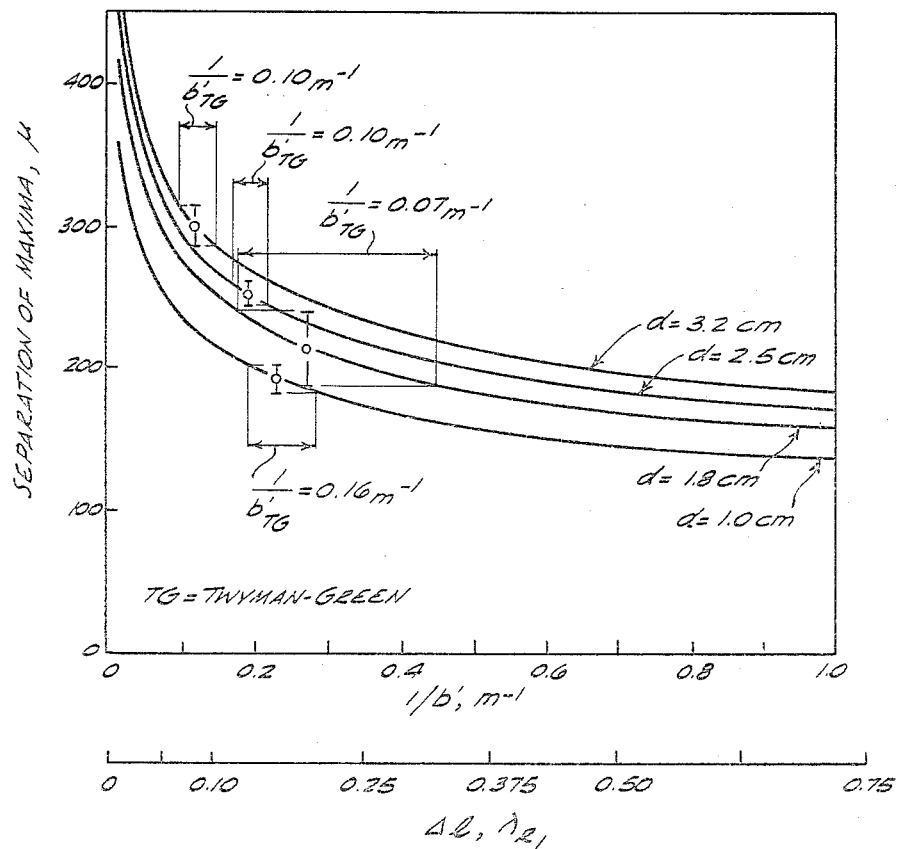
FIG. 3 is a function plot of the separation between maxima of a two-lobe pattern as a function of the reciprocal of the radius of curvature of the end-plates, with resonator length as a parameter.

This function is plotted in FIG. 3. It is important to note how rapidly $x_m$ decreases with $1/b'$ for small $1/b'$. This indicates that for even small departures from perfect plane-parallelism, a curved-plate resonator theory should be used. In FIG. 3 there is also plotted experimental data and indications for each point where the value $b'$ was measured by a Twyman-Green interferrometer. These values of $b'$ differ somewhat from those required by the theory. This suggests that the effective radius of curvature may change during the laser pulse. A difference in optical path length of only one part in $10^5$ over a transverse distance of 1 mm. would be required to give a $b'$ of 500 cm. in a 2 cm. long resonator. However, there exists another possible reason for the discrepancy in theoretical and measured $b'$. Since it is difficult to expect the effective curvature of the end-plates to be actually spherical, deviations from the theory of Boyd and Gordon may be simply due to irregular effective curvature of the end-plates.

The behavior of the curves of FIG. 3 suggest that the size of the transverse modes can be increased by decreasing the effective curvature of the resonator end-plates. Thus, if the effective radius of curvature of the end-plates during laser action is made to be 100 meters, a two-lobe mode (see FIG. 2(b)) with approximately 0.60 mm. between intensity maxima can be obtained using a one-inch long ruby. The curvature placed on the end-faces of the ruby rod should be chosen so that when it is combined with any changes in the curvature during laser action, the resultant effective curvature gives the desired mode size. Thus, the original curvature placed on the end-faces may even be negative, i.e., the faces may be concave.

The next problem is that of transverse mode selection. Since transverse modes are very closely spaced in frequency (approximately 100 mc. as estimated using the theory of Boyd and Gordon), simple mode selection methods such as what is known in the art as a multiple-reflector resonator (see the article in the Bell System Technical Journal, vol. 41, page 453, 1962 by D. A. Kleinman and P. O. Kisliuk) are inapplicable.

The laser normally operates in several transverse modes because the Q's of these modes are closely comparable. Therefore, if it were possible to reduce the Q's of all modes except the desired one, effective mode selection could be achieved. This reduction in Q's can be accomplished by reducing the reflectivity of the end-plates for all modes but one. This can be done, for example, by removing the silver from at least one of the mirrors 17 deposited on the ruby rod 13 everywhere except in the region whereat the electromagnetic field lobes of the desired mode are relatively high (see FIG. 2).

Figure 4:
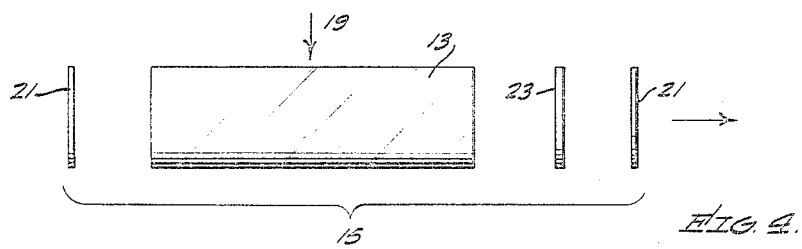
FIG. 4 is a schematic illustration of a further embodiment of the invention.

An alternative technique, as is illustrated in FIG. 4 as a further embodiment of the invention, could be the use of detached reflectors or mirrors 21 with an opaque screen or mask 23 placed between the ruby 13 and at least one of the mirrors 21. The mask 23 must have a hole (not shown) in it in the shape of the desired mode pattern.

Thus, the construction of a single transverse mode laser may proceed along the following lines:

I. For the embodiment shown in FIG. 1, (1) Select the proper end-plate curvature to give the desired transverse mode size and lap the ends of the ruby 13 accordingly.

(2) After evaporating silver 17 or other reflective material on the end-surfaces and thus providing a laser cell 15, excite the ruby 13 to oscillation by introducing to the cell 15 a non-uniform pumping field 19, and examine photographically the mode patterns at the output end of the ruby rod 13 during laser action very close to threshold pump power.

(3) Vary the pump energy distribution 19 around the periphery of the ruby 13 until the desired mode pattern is obtained (single or double lobe pattern, for example).

(4) Remove, by etching or other means, the silver 17 from an end-surface of the ruby rod 13 (or both end-surfaces) except in the regions where the fields (i.e., intensities) of the desired mode are high.

II. For the embodiment shown in FIG. 4, (1) Select the proper end plate curvature to give the desired transverse mode size and lap the detached reflector end-plates 21 accordingly.

(2) Coat the end-faces of the ruby 13 with an anti-reflection material (not shown), for example, by deposition of a dielectric coating such as magnesium fluoride.

(3) After evaporating silver or other reflective material on the end-plates 21 and thus providing a laser cell 15, excite the ruby 13 to oscillation by introducing to the cell 15 a non-uniform pumping field 19, and examine photographically the mode patterns at the output end of the laser during laser action very close to threshold pump power.

(4) Vary the pump energy distribution 19 around the periphery of the ruby 13 until the desired mode pattern is obtained.

(5a) Remove, by etching or other means, the silver from an end-plate 21 (or both end-plates) except in the regions where the fields (i.e., intensities) of the desired mode are high; or (5b) Mask either or both reflectors 21 by inserting a screen 23 of opaque material with a properly shaped hole (not shown) therein between the ruby 13 and at least one of the reflectors 21.

The advantage of using the detached reflectors is that it may be possible to use the same set of reflectors with different ruby samples.

Figure 5:
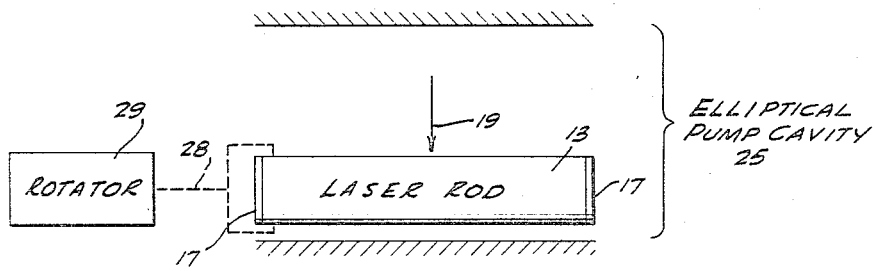
FIGS. 5 and 6 are embodiments of the invention showing two methods of providing a transverse mode controlled laser.
Figure 6:
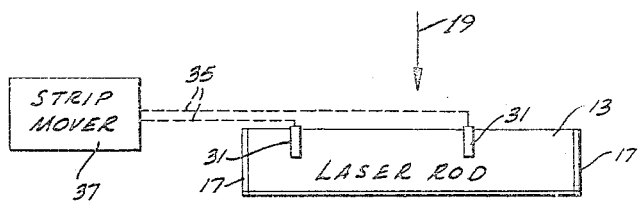

The non-uniform field 19 may be provided by the use of an elliptical type optical pumping cavity 25 (FIG. 5) or by placing opaque strips 31 between the pumping excitation 19 and the ruby rod 13, as shown in FIG. 6. The pump energy distribution may then be varied by rotating the ruby through a rotating means 28, 29 as seen in FIG. 5, or by moving the opaque strips 31 along the rod 13 by means 35 and a strip mover 37, as illustrated in FIG. 6.

Figure 7:
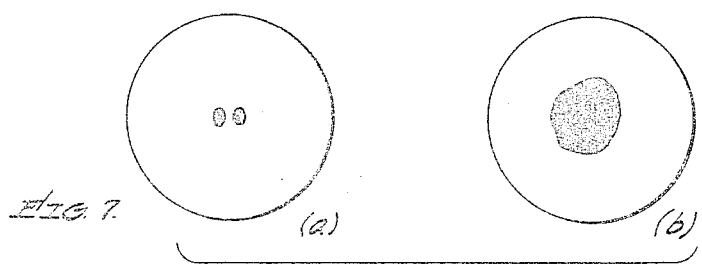
FIG. 7(a) illustrates a two-mode single mode pattern of a laser without mode control operating at threshold.
FIG. 7(b) illustrates the multimode pattern of the same laser used in FIG. 7(a) operating approximately at 15% above threshold.

FIG. 7 illustrates the output of a prior art ruby laser rod at low and high pumping levels. The excitation of additional transverse modes at high pumping levels ($\approx 15\%$ above threshold) is clearly illustrated in FIG. 2(b).

Figure 8:
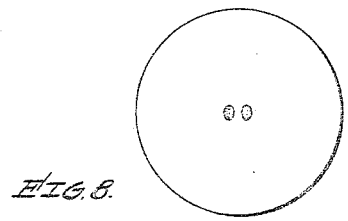
FIG. 8 illustrates a two-lobe single mode pattern of a transverse mode controlled laser according to the invention operating approximately 20% above threshold.

In FIG. 8 there is shown the output of the same laser rod (pumped $\approx 20\%$ above threshold) after one of the silver reflectors has been shaped or masked to favor or support a two-lobe mode. It is seen that even at high pumping levels only the two-lobe mode is excited. It should be noted that the total output of the laser is not much reduced by mode selection, indicating that not only unwanted modes are eliminated but also most of the energy that would ordinarily go into such modes are concentrated (in this example) into a single two-lobe mode.

It should be noted that for rubies of large cross-sectional areas, laser action is likely to occur at several locations on the face of the crystal. At each of these locations the characteristic of the modes will be determined by the local effective curvature of the end-plates. By properly shaping the reflectors, two (or more) regions on the ruby face can each be made to oscillate in a single mode. This technique, especially as applied to a continuously operating laser, can be useful in a Doppler radar type system, since one of the modes can be used as a local oscillator and the other as the signal. The use of a single ruby instead of two or more single mode lasers may alleviate stability problems.

It should also be mentioned that one of the possible techniques for selectively removing the unwanted silver from the optical resonator end-plates to favor the desired transverse mode, is the use of a photosensitive masking material such as Photoresist material. The technique would consist of depositing Photoresist material over the silver and exposing it while the laser is operating in the desired mode at a pump power very close to threshold, and subsequently removing the unexposed portion of the Photoresist and silver.

From the foregoing it can be seen that there has been described a laser wherein the laser output, obtained at high pumping levels, is of a preselected transverse mode having a characteristic frequency and beam width. Further, there have been described techniques for limiting the number of excited transverse modes at all pumping levels and for increasing the size of the cross-sectional area of the transverse modes. This will allow the concentration of most of the laser energy which heretofore went into a large number of modes into a single mode, thus obtaining stable, high-output, single-mode operation.

As was previously stated, the description has been limited to ruby lasers, but the invention should be applicable to other types of lasers.

Although two specific embodiments have been herein illustrated, it will be appreciated that other organizations of the specific arrangements shown may be made within the spirit and scope of the invention. Additionally, other components or elements may be substituted for those which have been particularly named and the method may be practiced using other techniques for varying the pumping field with respect to the laser material and for removing or restricting the reflectivity of the reflective material.

Accordingly, it is intended that the foregoing disclosure and the showings made in the drawings shall be considered only as illustrations of the principles of this invention and are not to be construed in a limiting sense.

What is claimed is:

1. A method for producing a transverse mode controlled laser comprising the steps of: placing laser material within an optical resonator having reflecting means optically coupled to said laser material to provide a laser cell, said laser cell having a plurality of characteristic modes of oscillation; providing a non-uniform pump energy distribution around the periphery of said laser material, said pump energy being just of sufficient magnitude to cause oscillation within said laser cell; selecting a desired transverse mode of oscillation from said plurality of modes by changing the relationship between said non-uniform pump energy distribution and said laser material; and modifying the reflective properties of said reflecting means to support only the selected transverse mode of oscillation.

2. A method for producing a transverse mode controlled laser, comprising the steps of: placing a ruby rod within an elliptical pumping cavity and resonator having mirrors of reflective material optically coupled to the end surfaces of said ruby rod to provide a laser cell, said laser cell having a plurality of characteristic modes of oscillation; pumping said rod with pump energy to provide a non-uniform field distribution around the periphery of said ruby rod, said pump energy being just of sufficient magnitude to cause oscillation within said laser cell; selecting a desired transverse mode of oscillation from said plurality of modes by rotating said ruby rod with respect to said elliptical pumping cavity; and removing all of said reflective material except those portions supporting only the selected transverse mode of oscillation.

3. A method for producing a transverse mode controlled laser, comprising the steps of: placing a ruby rod within an optical resonator having a mirror of reflective material optically coupled to each end surface of said ruby rod to provide a laser cell, said laser cell having a plurality of characteristic modes of oscillation; pumping said laser cell with pump energy through opaque strips to provide a non-uniform field distribution around the periphery of said ruby rod, said pump energy being just of sufficient magnitude to cause oscillation within said laser cell; selecting a desired transverse mode of oscillation from said plurality of modes by moving said strips with respect to said ruby rod; and etching away all of said reflective material except those portions supporting only the selected transverse mode of oscillation.

References Cited by the Examiner

UNITED STATES PATENTS 3,136,959  6/1964  Culver _____ 331—94.5
3,242,439  3/1966  Rigden et al. _____ 331—94.5

OTHER REFERENCES

Baker et al.: "Mode Selection and Enhancement With a Ruby Laser," Appl. Optics, vol. 1, No. 5, September 1962, p. 674.

JEWELL H. PEDERSEN, *Primary Examiner.*

RONALD L. WIBERT, *Examiner.*